United States Patent
Haeberle et al.

(10) Patent No.: US 6,369,400 B2
(45) Date of Patent: *Apr. 9, 2002

(54) MAGNETIC SCANNING OR POSITIONING SYSTEM WITH AT LEAST TWO DEGREES OF FREEDOM

(75) Inventors: Walter Haeberle, Waedenswil; Mark I. Lutwyche, Adliswil; Peter Vettiger, Langnau, all of (CH)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,449

(22) Filed: Oct. 6, 1999

(30) Foreign Application Priority Data

Oct. 30, 1998 (EP) .............................. 98120527

(51) Int. Cl.[7] .............................................. G01N 21/86
(52) U.S. Cl. .................................. 250/548; 250/559.29
(58) Field of Search ........................... 250/234, 559.29, 250/559.3, 548, 236; 356/375; 335/148–153, 120, 132

(56) References Cited

U.S. PATENT DOCUMENTS 6,313,905 B1 * 11/2001 Brugger et al. ............... 355/55

FOREIGN PATENT DOCUMENTS

| DE | 195 30 341 A1 | | 2/1997 |
|---|---|---|---|
| EP | 0 763 881 A2 | | 3/1997 |
| GB | 2311372 | * | 9/1997 |
| JP | 5688666 | | 7/1981 |
| JP | 0113417 | | 5/1982 |
| JP | 1243838 | | 9/1989 |
| JP | 1176904 | | 12/1989 |
| JP | 3276314 | | 6/1991 |
| WO | 9607074 | | 3/1996 |

OTHER PUBLICATIONS

W. Dotzel et al., "Mikromechanische Aktoren magnetisch betatigen", vol. 100, No. 11, Nov. 1992, pp. 487–493.
B. Wagner et al., "Permanent Magnet Micromotors on Silicon Substrates", Journal of Microelectromechanical Systems, vol. 2, No. 1, Mar. 1993, pp. 23–29.
R. Holzer et al., "Hybrid Electrostatic–Magnetic Microactuators", Proceedings of IEEE Int'l. Conf. on Robotics and Automation, vol. 3, Magoya, Japan, May 1995, pp. 2941–2946.
M. Lutwyche et al., Microfabrication and parallel operation of 5x5 2D AFM cantilever arrays for data storage and imaging, 1998 IEEE.

* cited by examiner

Primary Examiner—Que T. Le
(74) Attorney, Agent, or Firm—Marian Underweiser (57) ABSTRACT

A scanning or positioning system with at least two degrees of freedom is provided comprising a supporting base equipped with magnets, a movable platform equipped with at least two electrical coils, and suspension elements providing an elastic connection between the movable platform and the supporting base. The electrical coils are positioned flat on the movable platform, thereby forming an essentially flat arrangement with the movable platform. Combining the flat arrangement with the flat supporting base yields a scanning or positioning system which is potentially compact, lightweight and flat and which features fast response, low power consumption and a relatively large range of motion, e.g. up to 10 mm. The scanning or positioning system with at least two degrees of freedom can be used in the field of scanning probe microscopy or in the field of data storage or imaging.

29 Claims, 6 Drawing Sheets

MAGNETIC SCANNING OR POSITIONING SYSTEM WITH AT LEAST TWO DEGREES OF FREEDOM

BACKGROUND OF THE INVENTION

1. Field of the Invention

The present invention is related to a magnetic scanning or positioning system with at least two degrees of freedom.

2. Discussion of the Related Art

Magnetic actuators are ubiquitous. They are economical, reliable, easy to power and provide good power to weight and power to volume ratios. They can be found in a large variety of applications ranging from a large train to the smallest timepiece. However, most magnetic actuators—even the smallest ones—are still made using wound coils rather than a batch fabrication process.

Hard disk drives contain magnetic actuators for positioning the read/write heads. The actuators are usually compact and flat, but they are only able to generate a one-dimensional rotational movement. This limits their use to specific applications. Another design is needed for storage systems where a surface of a storage medium is to be scanned in x and y direction.

In the PCT patent application WO 96/07074, as published on Mar. 7, 1996, and currently owned by the present applicant, a fine positioning apparatus with atomic resolution is described. The fine positioning apparatus basically comprises magnetic actuators and—in the preferred embodiment—mechanical means for damping or decreasing the motion of said magnetic actuators. The driving system of said magnetic actuators is similar to a voice coil. The fine positioning apparatus according to WO 96/07074 is therefore referred to as 'voice coil actuator'. It can be used in the field of Scanning Probe Microscopy such as Scanning Tunneling Microscopy (STM) or Atomic Force Microscopy (AFM) and/or in the field of data storage, where precise positioning of magnetic, optical, electrical or mechanical writing and sensing devices is crucial.

In the paper 'Microfabrication and parallel operation of 5×5 2D AFM cantilever arrays for data storage and imaging' by M. Lutwyche et al., Proc. IEEE Int'l Workshop on MICRO ELECTROMECHANICAL SYSTEMS (MEMS' 98), Heidelberg, Germany, Jan. 25–29, 1998, a fine positioning system with 5 degrees of freedom is presented. A 2D AFM cantilever array is scanned in x and y direction—i.e. parallel to a surface of the array—using voice coil actuators with ranges of 30 $\mu$m and 15 $\mu$m, respectively. Three additional voice coil actuators, also with a 30 $\mu$m-range, are used in a triangular arrangement to move and level the sample in z direction—i.e. perpendicular to a surface of the array. The main disadvantage of said fine positioning system is its volume and weight.

For data storage applications as well as in other applications such as optical beam scanners or optical focusing and alignment systems, a scanning or positioning system is needed, which is small, flat, lightweight, and shock resistant and which features fast response, low power consumption, and a large range of motion.

SUMMARY OF THE INVENTION

It is an object of the present invention to overcome the drawbacks of known scanning or positioning systems.

It is still another object of the present invention to provide a scanning or positioning system with at least two degrees of freedom, which is small, flat and lightweight, and which features fast response, low power consumption and a potential range of motion between 1 $\mu$m and 10 mm.

It is still another object of the present invention to provide a scanning or positioning system which can be fabricated using common batch fabrication techniques, and to provide a method for making such scanning or positioning systems.

This is accomplished by the scanning or positioning system and fabrication process described in the present application. The scanning or positioning system comprises a supporting base equipped with at least one magnet, a movable platform equipped with at least two electrical coils, and suspension elements providing an elastic connection between the movable platform and the supporting base. The magnet and the electrical coils are arranged in such a way that translational and/or rotational relative movements of the movable platform and supporting base are generated when a current is passed through the electrical coils. The electrical coils are positioned flat on or in the movable platform, thereby forming an essentially flat arrangement with the movable platform.

Figure 2:
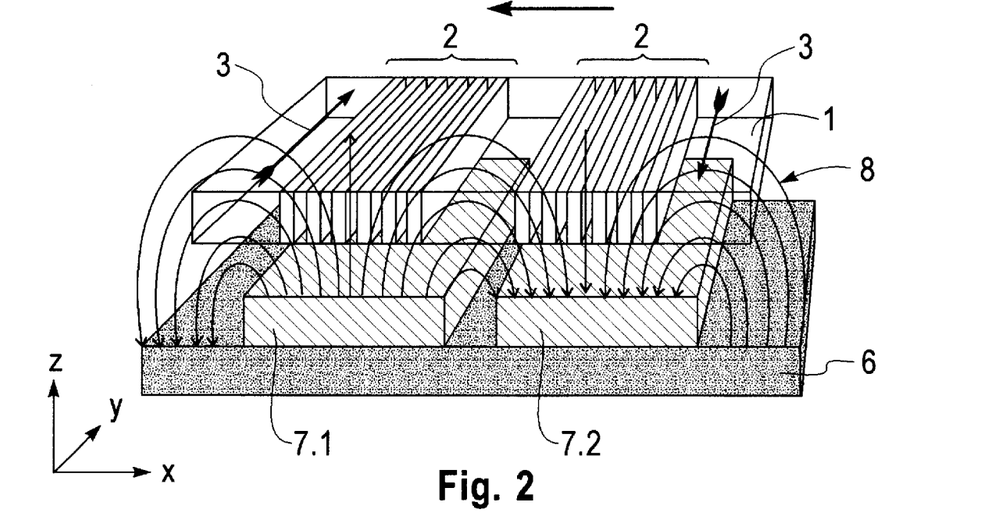
FIGS. 2 and 3 illustrate the working principle and the basic arrangement of coil windings and permanent magnets for motion in x and y direction (FIG. 2) and in z direction (FIG. 3).
Figure 3:
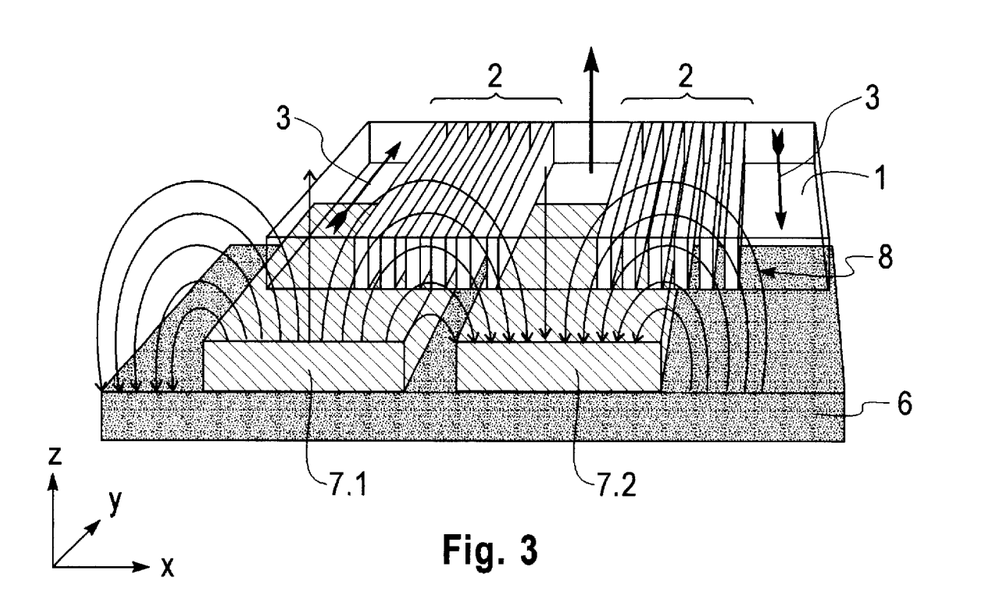

The working principle and the basic arrangement of the coil windings and permanent magnets are shown in FIGS. 2 and 3. In FIG. 2 the windings are placed in the vertical field of permanent magnets, whereby one half of the electrical coil is located over a N-pole and the other half over a S-pole. When a current is passed through the electrical coil, a force is generated moving the electrical coil to the left (direction of current flow and magnetic field as indicated in the drawing).

In FIG. 3 the windings are placed in the horizontal or fringe field of permanent magnets, whereby one half of the electrical coil is located between the poles and the other half beside one of the poles. When a current is passed through the electrical coil, a force is generated moving the electrical coil upwards (in z direction; direction of current flow and magnetic field as indicated in the drawing). Using two electrical coils located on opposite sides of the movable platform allows to generate a tilt about a horizontal axis (x or y tilt). The up and down movement as well as the x and y tilt have only a limited range of motion. But nevertheless they are very important for many applications.

The flat arrangement of the movable platform and the electrical coils opens new possibilities for the construction and fabrication of the movable parts. Lightweight construction is enhanced in particular. A feature which is desired for fast response and low power consumption. The sensitivity to shocks and vibrations is reduced too. The resonant frequency is in the order of 100 Hz to 1 kHz for a range of motion between 100 $\mu$m and 1 mm.

Another advantageous feature of the scanning or positioning system with at least two degrees of freedom is its relatively large range of motion in horizontal direction. NOTE: A piezoelectric actuator has a range of motion of about 10 $\mu$m or less.

Combining the flat arrangement of the movable platform and the electrical coils with a flat supporting base and flat (permanent) magnets yields a scanning or positioning system, which is potentially compact, lightweight, and flat and which has a good power to volume and power to weight ratio. The scanning or positioning system can be used in a large variety of applications including present and future data storage and imaging systems. The outer dimensions of such a storage system could be about 20 mm×20 mm×4 mm for the complete system.

NOTE: The smallest version of the known voice coil scanner has outer dimensions of about 30 mm×30 mm×30 mm.

Various modifications and improvements of the scanning or positioning system are as follows:

Power performance of the scanning or positioning system can be improved by placing a component part comprising a ferro-magnetic material on the side opposite to the permanent magnets e.g. by covering the system with a magnetic steel sheet which closes the magnetic circuit on top. This decreases the reluctance and makes the magnetic field more uniform. The cover sheet may have an opening, where the movable platform can be accessed.

The movable platform may be equipped with discrete flat coils which are attached e.g. by gluing or soldering.

Good flatness is achieved when the coils are spiral in shape, i.e. when the coil windings lay all in one single plane.

The fabrication is simplified considerably when the movable platform and the suspension elements are fabricated as one part. In this case it is possible to use the same substrate and/or process sequence for the fabrication. In the same way the movable platform and suspension elements can be combined with a supporting frame, to which said suspension elements are connected. Using the same substrate allows to apply batch or other mass production techniques.

Batch processing can also be applied when the electrical coils are an integral part of the movable platform. If the coils are located on the movable platform, the processes used are similar as in printed circuit board fabrication, whereby additive or subtractive processing may be used. Thick film processing may also be applied. If the coils are located in the movable platform, similar process steps as in the fabrication of integrated circuits are used. In both cases, the movable platform, the electrical coils and the electrical conductors needed to connect the coils can be fabricated in the same process sequence.

Of course it is also possible to combine the fabrication of the movable platform and electrical coils with the fabrication of the suspension elements and the supporting frame. Beside economical benefits batch processing has also the advantage that the resulting components exhibit maximum flatness.

Suitable substrates are e.g. oxidized silicon wafers or flat sheets consisting of $SiN_x$ or a ceramic material or a metal.

Optimum power to weight and power to volume ratios can be achieved when the electrical coils constitute the major part of the movable platform. Such a movable platform can be fabricated using the process described in the claims and the Detailed Description section.

Up to six degrees of freedom are possible, when the movable platform is equipped with additional coils and the supporting base with additional permanent magnets.

The suspension elements may have the form of long narrow beams. This has several advantages especially when the beams are fabricated together with the movable platform using the same substrate and/or the same process sequence. Long narrow beams will help to decrease stiffness of the platform suspension and to increase fatigue-life of the beams.

In a modification said long narrow beams are divided into at least two portions, whereby adjacent portions form a right angle. This allows an extended length by carrying the beams around the movable platform and free deformation in more than one direction.

System performance might be improved by using a ferro-fluid to close part of the air gap between the permanent magnets and the electrical coils. This allows better cooling of the electrical coils.

In a modification of the scanning or positioning system, the (permanent) magnets are located on or in the movable platform and the electrical coils on or in the supporting base. In this case the movable platform and the suspension elements can be made of a thin magnetic steel sheet. The supporting base is preferably also made of magnetic steel. This allows to achieve a thin air gap and a high magnetic induction giving the system a high power performance.

The scanning or positioning system can be used to advantage in data storage systems. Such a system may comprise a storage medium with nm-sized magnetic storage elements, one or several magnetic read/write heads located e.g. on an Atomic Force Microscope (AFM) cantilever, and said scanning or positioning system, which is used to approach, to align and to scan the storage medium with the magnetic read/write heads.

The invention can also be used to advantage in approach systems. Such a system comprises a planar device, e.g. a flat substrate which needs to be patterned, and a second device as e.g. an AFM cantilever or an array of AFM cantilevers each with one or several apertures. During patterning the cantilevers act as shadow masks as addressed in copending patent application 98118283.5 filed on Sep. 28, 1998, currently assigned to the present applicant. The approach system further comprises said scanning or positioning system, at least three controllers for the z movement and x and y rotation, and at least three sensors for detecting the bending of the cantilevers at three different locations. The output signal of the sensors is fed to the controllers. The approach system can be used to approach the substrate with the cantilever array so that the surfaces of the substrate and the cantilever array are essentially parallel, and to maintain the cantilever array at constant height with respect to the substrate.

The scanning or positioning system can also be used to advantage in scanning probe systems such as AFM or STM systems and applications. Due to the large range of motion it allows coarse as well as fine positioning.

BRIEF DESCRIPTION OF THE DRAWINGS

The invention is described in detail below with reference to the following schematic drawings. All the figures are for the sake of clarity not shown in real dimensions, nor are the relations between the dimensions shown in a realistic scale.

DETAILED DESCRIPTION OF THE PREFERRED EMBODIMENTS OF THE INVENTION

Figure 1A:
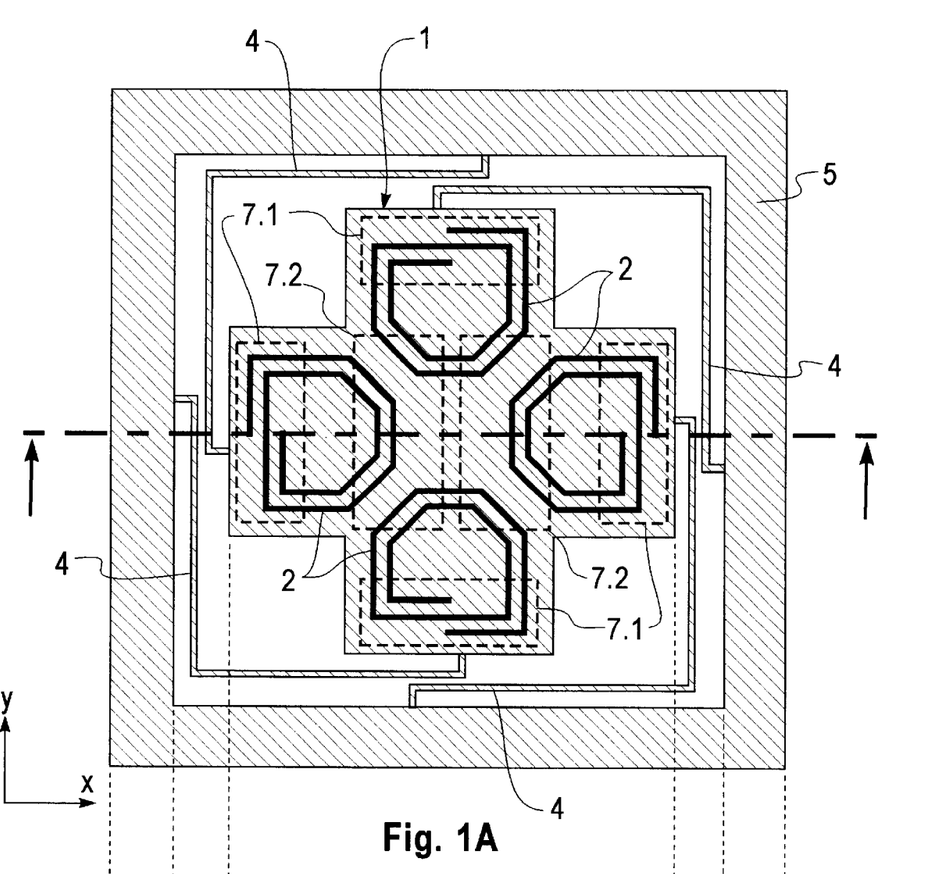
FIGS. 1*a* & 1*b* show a top view and cross section of a first embodiment of the invention with two degrees of freedom (movement in x and y direction).
Figure 1B:
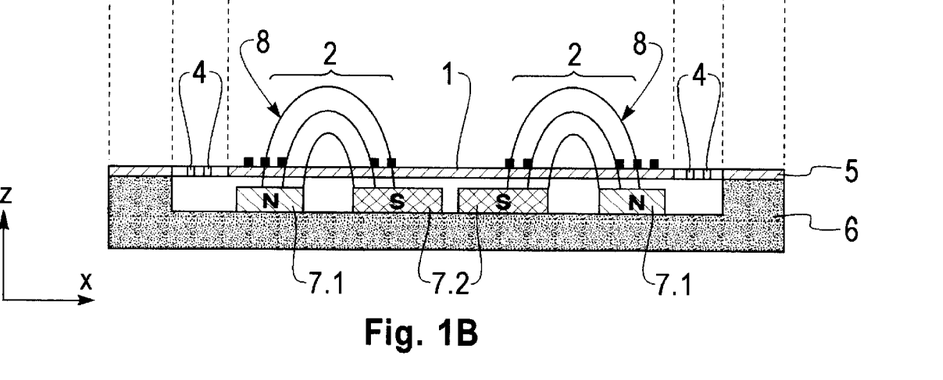

In a first embodiment of the invention a scanning or positioning system with two degrees of freedom is described (movement in x and y direction). The top view and cross section are shown in FIGS. 1*a* and 1*b*. The scanning or positioning system comprises a supporting base 6 equipped with six permanent magnets 7.1 and 7.2 preferably of equal size, which produce a static magnetic field. Note that any other kind of magnet, such as electromagnets, can be used instead. The four outer magnets 7.1 have all the same polarization (N-poles), whereas the two inner magnets 7.2 have opposite polarization (S-poles), as indicated in FIG. 1b. The supporting base 6 is preferably made of magnetic steel, thereby closing the magnetic circuit between N- and S-poles on the lower side. The magnetic field on the upper side is schematically represented in FIG. 1b by the magnetic lines of force 8. In the present embodiment, the outer dimensions of the supporting base 6 are about 20 mm×20 mm, and the thickness about 3 mm. The permanent magnets 7.1 and 7.2 do not protrude above the supporting base 6, so that the arrangement consisting of the supporting base 6 and the permanent magnets 7.1 and 7.2 is essentially flat. Essentially flat means that the aspect ratio R of the overall length to the overall thickness is greater than 4:1 (i.e. R>4), and typically about 10:1 (R=10) or even greater.

The scanning or positioning system further comprises a movable platform 1 equipped with four electrical coils 2 which are spiral in shape, a supporting frame 5, and four suspension elements 4 providing an elastic connection between the movable platform 1 and the supporting frame 5. The arrangement consisting of the movable platform 1 and the electrical coils 2 is also essentially flat, i.e. the aspect ratio R is greater than 4:1 (R>4) and typically about 15:1 (R=15). All unused areas on the movable platform 1 are cut off in order to keep the mass as low as possible. The connections of the electrical coils 2 to external power supplies are for the sake of clarity not shown in FIGS. 1a and 1b. The connections could be made using e.g. discrete wiring, or a second level of metallization for connecting the inner end of the electrical coils 2, and for connecting the electrical coils 2 to external terminals using electrical conductors running via the suspension elements 4.

The electrical coils 2 come to lie in the vertical field of the permanent magnets 7.1 and 7.2, whereby the S-poles 7.2 are shared by all electrical coils 2. The permanent magnets 7.1 and 7.2 and the movable platform 1 are separated by a gap, so that they do not make contact. In operation, a current passing through one of the electrical coils 2 generates a force in x or y direction, i.e. parallel to a surface of the movable platform 1. A translational movement is generated when the vector of current flow in opposite electrical coils is equal, an additional angular moment and rotational movement around the z axis is generated when the vector of current flow in opposite electrical coils is not equal (i.e. different in direction or magnitude). In order to achieve proper translational movements, the force generated by a single current carrying coil or a group of coils must be in line with the reaction force of the platform suspension. This is best achieved by a symmetrical arrangement of the electrical coils 2 and the suspension elements 4. In the present embodiment, a pair of coils is used each for the x and y movement, and the arrangement of the electrical coils 2 is axially symmetrical, exhibiting four fold symmetry. The arrangement of the suspension elements 4 is axially symmetrical too, and also exhibiting four fold symmetry. All four suspension beams have the same shape and the same spring constant. The attachment to the movable platform 1 and the supporting frame 5 is usually also symmetrical, and preferably located in the centers or corners of the platform and frame outline.

The movable platform 1 with the electrical coils 2, the supporting frame 5, and the suspension elements 4 are fabricated in the same process sequence using batch fabrication techniques. Following fabrication process may be used: Starting with a larger substrate such as a oxidized silicon wafer, the electrical coils 2 are made by e.g. deposition of a seed layer followed by a lithography and etching step. The conductors are then built up using galvanic plating. The movable platform 1, the supporting frame 5 and the suspension elements 4 are defined in a second lithography and etching step. The movable platform 1 with the electrical coils 2, the supporting frame 5, and the suspension elements 4 thus produced have an overall thickness of about 0.8 mm and form an essentially flat arrangement having an aspect ratio R of about 27. The outer dimensions of the complete scanning or positioning system are typically about 20 mm×20 mm×4 mm.

In the most basic embodiment (not illustrated in any Figure), the scanning or positioning system with two degrees of freedom (e.g. movement in x and y direction) comprises the supporting base 6 equipped with just one (permanent) magnet 7.1 or 7.2 with either N- or S-pole up. The supporting base 6 is preferably made of magnetic steel, thereby closing the magnetic circuit on the lower side. The system further comprises the movable platform 1 equipped with only two electrical coils, the supporting frame 5, and four suspension elements 4 providing an elastic connection between said movable platform 1 and said supporting frame 5. The electrical coils 2 are placed partially, e.g. with one half in the vertical field of the (permanent) magnet 7.1 or 7.2, whereby one coil is placed along the length and one along the width of the permanent magnet 7.1 or 7.2. The permanent magnet 7.1 or 7.2 and the movable platform 1 are separated by a gap, so that they do not make contact. In operation, a current passing through one of the electrical coils 2 generates a force in x or y direction, i.e. parallel to a surface of the movable platform 1.

Figure 4:
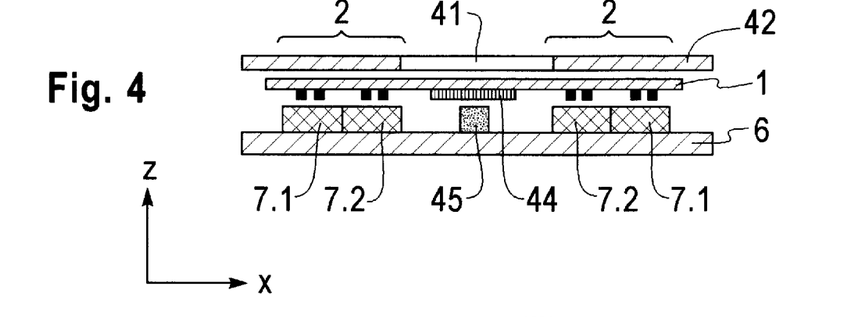
FIG. 4 shows an embodiment wherein the scanning or positioning system is covered with a magnetic steel sheet.

In another embodiment shown in FIG. 4 the scanning or positioning system is covered with a magnetic steel sheet 42. The opening 41 in the center of the magnetic steel sheet 42 is optional and depends on the application. The movable platform 1 is equipped with four electrical coils 2, two of which are shown in the cross section in FIG. 4. The scanning or positioning system further comprises a supporting base 6 equipped with 4 pairs of permanent magnets 7.1 and 7.2, of which two pairs are shown in the cross section of FIG. 4. The permanent magnets 7.1 and 7.2 and the electrical coils 2 are located outside the opening 41 to take full advantage of said magnetic steel sheet 42. In operation, a current passing through one of the electrical coils 2 generates a force in x or y direction, i.e. parallel to a surface of the movable platform 1. Due to the magnetic steel sheet 42 at the top, the reluctance of the magnetic circuit is decreased, while the magnetic induction and power efficiency is increased. In addition, the magnetic field between the permanent magnets 7.1 and 7.2 and the magnetic steel sheet 42 is more uniform than the open field of the first embodiment. A typical application are storage systems. Such a system may comprises a storage medium 44 located on the movable platform 1 and a read/write head 45 located on the supporting base 6. In another application not shown in FIG. 4 an AFM cantilever could be attached to the movable platform 1. The cantilever may be used to scan a surface of an external device. In this case said opening 41 in the magnetic steel sheet 42 will be needed.

Figure 5:
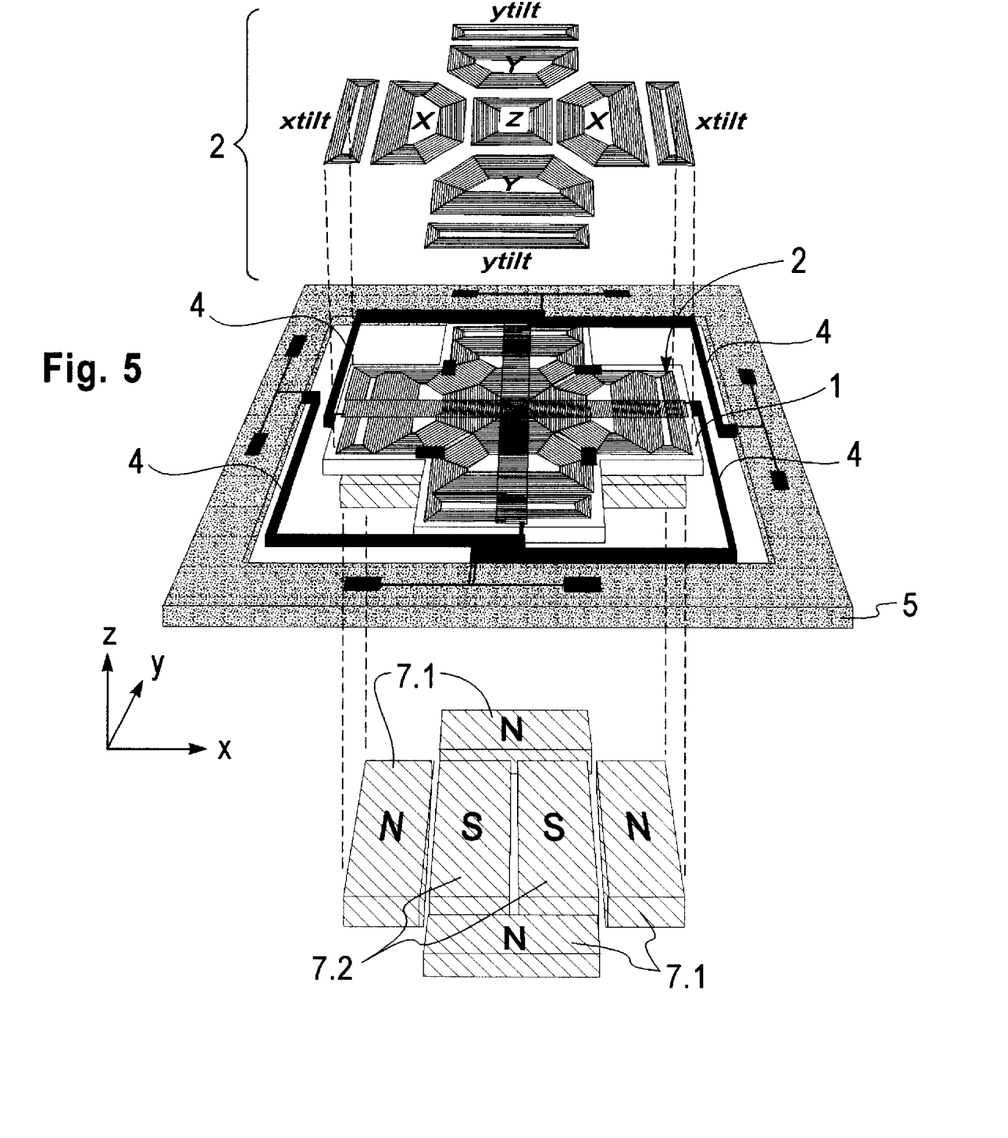
FIG. 5 shows an embodiment of the invention with 5 degrees of freedom.

Another embodiment of the invention is shown in FIG. 5. It is a planar scanning or positioning system with 5 degrees of freedom. The scanning or positioning system comprises a movable platform 1 equipped with 9 electrical coils 2, a supporting frame 5, and four suspension elements 4 providing an elastic connection between said movable platform 1 and said supporting frame 5. The outer dimensions of the supporting frame 5 are about 20 mm×20 mm. The nine electrical coils 2 have following functions: 2 are for the x, 2 are for the y and 1 for the z motion, and 2 each for the x and y rotation. With an extra coil, a z rotation would also be possible. The arrangement of said electrical coils 2 is shown in the upper part of FIG. 5. Said suspension elements 4 have the shape of long narrow beams, i.e. the ratio of their length to their width is more than 10 and typically about 40, and each beam is divided into two portions which form a right angle. Alternatively, the suspension elements 4 could e.g. comprise relatively large elements made of an elastomeric material. In the present embodiment, said long narrow beams mainly consist of two copper-conductors running parallel at narrow distance. Said copper-conductors are used for supplying current to said electrical coils 2. Three of the conductors are used as ground, leaving one each for the x, y and z motion and the two rotations. The length of the suspension elements is determined so that a current of 0.5 A provides a motion of about 1 mm in x andy direction and of about 100 $\mu$m in z direction. This gives a resonant frequency in the order of 100 Hz. A current of 0.5 A will cause a temperature rise in the order of 2 degrees C. The scanning or positioning system further comprises six permanent magnets 7.1 and 7.2 placed in a plane under the movable platform 1, whereby the poles are shared by several coils. The permanent magnets 7.1 and 7.2 are separated from the movable platform 1 by a gap so that they do not make contact. The arrangement of the permanent magnets 7.1 and 7.2 is shown in the lower part of FIG. 5. The permanent magnets 7.1 and 7.2 are located on a supporting base which is for the sake of clarity not shown in FIG. 5. In operation, a current passing through the electrical coils 2 generates a force which moves the movable platform 1 in x, y or z direction or rotates it a little about the x or y axis. The electrical coils 2 are integrated in the movable platform 1 and are fabricated in the same process sequence as the suspension elements 4 and the supporting frame 5 using the batch process described in the next paragraph.

A batch process for fabricating a movable platform 1 with integrated electrical coils 2 is described. Suspension elements 4 and a supporting frame 5 may also be fabricated in the same sequence. The process is illustrated in FIGS. 6a to 6i. Said process starts with a larger substrate 61, such as a oxidized silicon wafer about 500 $\mu$m thick with about 1 $\mu$m of thermal oxide on both sides.

Figure 6A:
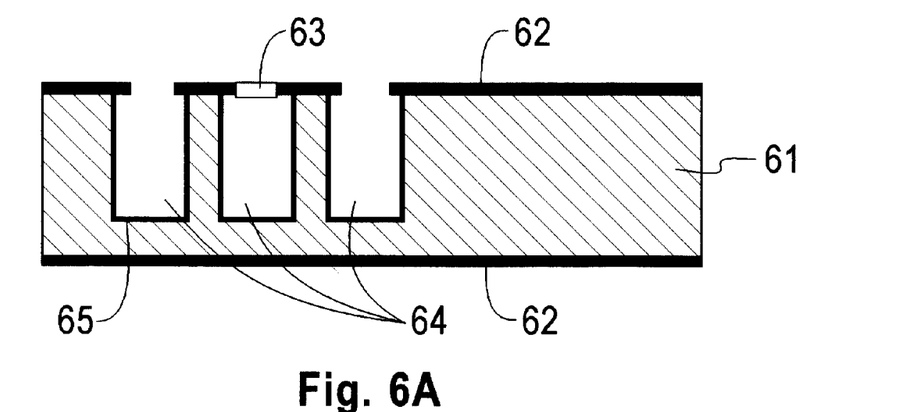
FIGS. 6*a* to 6*i* illustrate a fabrication process, in accordance with the present invention, for manufacturing a movable platform with integrated electrical coils.

First deep trenches 64 are defined, which have the shape of the electrical coils 2 to be formed. FIG. 6a shows the silicon wafer 61 with the deep trenches 64. The deep trenches 64 could be produced as follows: The wafer 61 is coated with a resist, which is patterned using a mask defining the lateral shape of the electrical coils 2 and connections. Along the windings and connections narrow bridges 63, about 10 $\mu$m wide are left every 1 mm. First the oxide 62 is etched either by a wet or dry process. A deep trench anisotropic etch is then carried out, about 380 $\mu$m deep into the wafer 61. This is followed by a 5 $\mu$m isotropic etch which undercuts the oxide 62 and releases the bridges 63.

The wafer is then re-oxidized so that the deep trenches 64 have an isolating oxide coat 65.

Figure 6B:
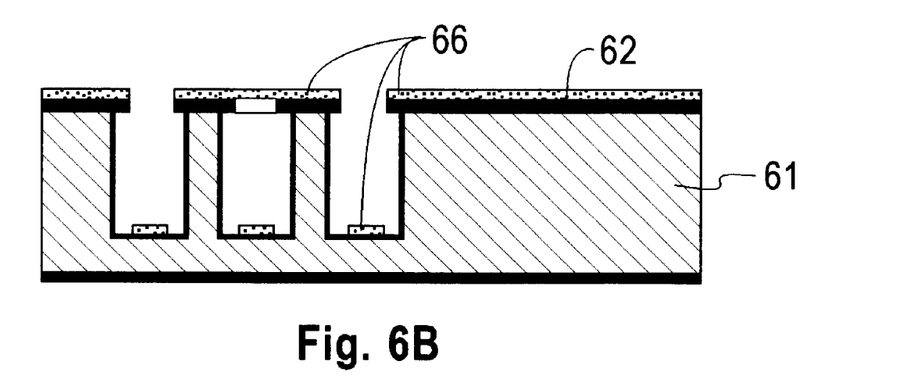
Figure 6C:
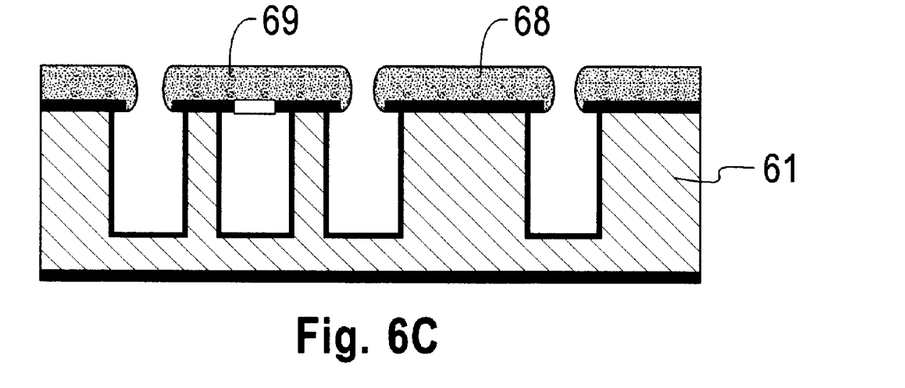

Then a seed layer 68 is deposited as shown in FIGS. 6b and 6c: A layer of titanium for adhesion—and a layer of copper, about 1 $\mu$m thick are deposited on the front side. The undercut of the oxide 62 effects, that the metal 66 at the bottom of said deep trenches 64 is not contacted to the top. Thus, when 20 $\mu$m of copper are electroplated on the top, the bottom of the deep trenches 64 is not plated. The copper at the bottom of the deep trenches 64 can be etched away using wet etching.

Figure 6D:
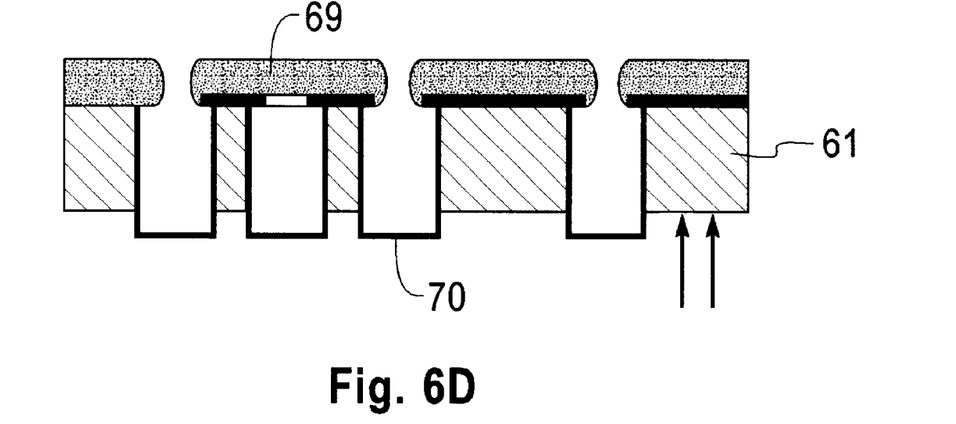

FIG. 6d shows the wafer 61 after opening of the deep trenches 64 from the backside. This can be done as follows: The oxide 62 is removed from the back of the wafer 61 and the silicon from the backside is wet etched in tetramethyl ammonium hydroxide (TMAH) until the bottom of the deep trenches 64 is reached. On the backside, the oxide 70 at the bottom of the deep trenches 64 is left. During backside etching the wafer 61 is held intact by the bridges 69 which are relatively rigid owing to their 20 $\mu$m copper coat.

Figure 6E:
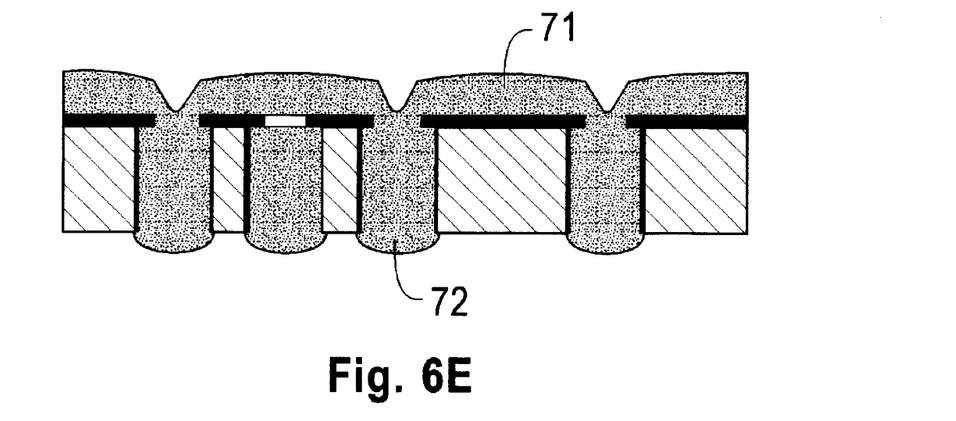

In FIG. 6e the deep trenches 64 have been filled with a conductive material. This could be done as follows: The oxide 70 at the bottom of the deep trenches 64 can be removed either by e.g. dry etch, wet etch or simply by mechanical means, for example by brushing with a small paint brush. The wafer 61 is now mounted backside up in an electroplater, and copper is plated to fill the deep trenches 64 using the front side copper (68, 69) as a seed.

Figure 6F:
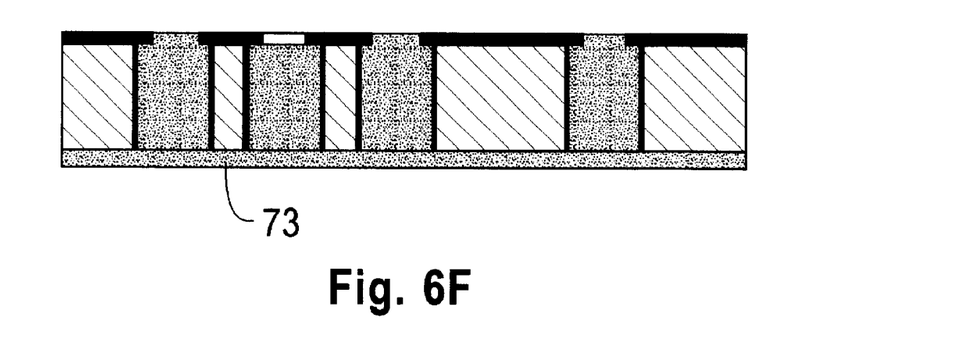
Figure 6G:
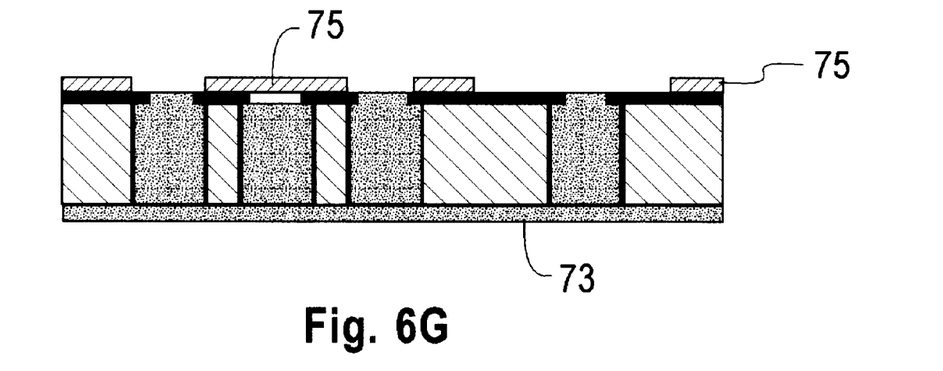
Figure 6H:
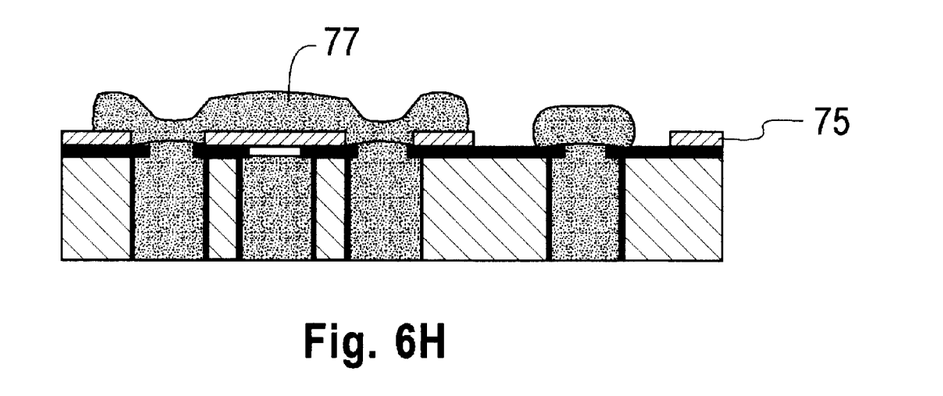

Next a second level metallization 77 is applied as shown in FIGS. 6f to 6h. The second level metallization 77 could be produced as follows: The copper 71 on the front side is etched back until there are no shorts between the windings of the coil(s). Then a fresh copper contact layer 73 is evaporated onto the backside. A photo resist 75 with good insulation properties e.g. an epoxy, PMA or PMMA based photo resist is then spun onto the front side and patterned. This photo resist 75 has two functions. First it defines the final release structure of the movable platform 1 and of additional parts like the suspension elements 4 or the supporting frame 5. The second function is to act as dielectric insulation between the windings and connections in the deep trenches 64 and the second metallization layer 77 which connects the various electrical coils 2 together. Via holes are made in the photo resist 75 for contacting the electrical coils 2. A seed layer of titanium and copper is then deposited and patterned by wet etch to define the second metallization wiring. The seed layer is then electroplated with copper, about 15 $\mu$m thick, to form the second level metallization 77. The 1 $\mu$m contact layer 73 on the backside is then etched away by wet etching.

Figure 6I:
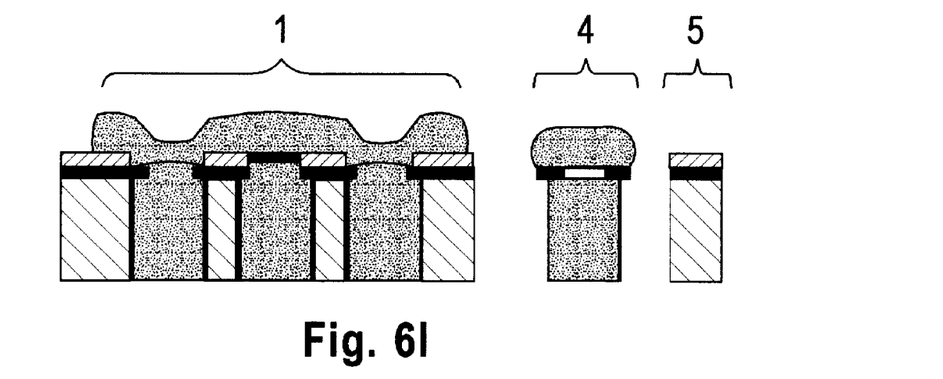

The final step is shown in FIG. 6i: The movable platform 1 is released from the substrate 61 by removing the substrate areas around the movable platform 1. This can be done by e.g. Deep Reactive Ion Etching using the insulating photo resist 75 and the copper as an etch mask. The suspension element 4 and the supporting frame 5 can be released from the substrate 61 in the same step.

It is to be noted that the above mentioned process steps need not to be executed in the given order.

Typical applications of the described scanning or positioning system include scanning probe systems such as Atomic Force Microscopy (AFM) or Scanning Tunneling Microscopy (SMT) systems and their applications, data storage systems, optical beam scanners, integrated optical alignment systems, focusing systems, fine positioning in robotics,
consumer products like video cameras.

What is claimed is:

1. A magnetic scanning or positioning system with at least two degrees of freedom comprising
   a supporting base equipped with at least one magnet,
   a movable platform equipped with at least two electrical coils, and
   suspension elements providing an elastic connection between said movable platform and said supporting base,
   wherein said magnet and said electrical coils are arranged in such a way that translational and/or rotational relative movements of said movable platform and supporting base are generated when a current is passed through said electrical coils, and said electrical coils are positioned flat on or in said movable platform, thereby forming an essentially flat arrangement with said movable platform.

2. The system according to claim 1, wherein said supporting base and the magnet are flat and positioned in such a way that an essentially flat arrangement is formed.

3. The system according to claim 1, wherein said system is covered by a sheet comprising a magnetic material to close the magnetic circuit on top.

4. The system according to claim 1, wherein said electrical coils are flat coils attached to said movable platform.

5. The system according to claim 1, wherein said electrical coils are spiral in shape.

6. The system according to claim 1, wherein said electrical coils constitute an integral part of said movable platform.

7. The system according to claim 1, wherein said electrical coils constitute the major part of said movable platform concerning weight or volume.

8. The system according to claim 1, wherein said movable platform is equipped with additional coils and said supporting base with additional magnets thereby allowing up to six degrees of freedom.

9. The system according to claim 1, wherein said suspension elements or an electrically conducting part of said suspension elements are used for supplying said current to said electrical coils.

10. The system according to claim 1, wherein said suspension elements and said movable platform have been fabricated using the same substrate, and/or the same process sequence as said movable platform and/or said electrical coils.

11. The system according to claim 1, wherein said suspension elements and a supporting frame, to which said suspension elements are connected, have been fabricated using the same substrate, and/or the same process sequence.

12. The system according to claim 1, wherein said suspension elements are elongated beams.

13. The system according to claim 12, wherein said elongated beams are divided into at least two portions, whereby adjacent portions form an angle.

14. The system according to claim 13, wherein said angle is a right angle.

15. The system according to one of claim 1, wherein the movable platform comprises a substrate made of Si, or $SiN_x$, or a ceramic material, or a metal.

16. The system according to one of claim 1, wherein said movable platform and said at least two electrical coils have been fabricated by planar and/or thin film and/or thick film and/or galvanic processing.

17. The system according to claim 1, wherein the gap between said magnet and the movable platform and/or said electrical coils is filled with ferro-fluid.

18. A magnetic scanning or positioning system with at least two degrees of freedom comprising:
   a supporting base equipped with at least two electrical coils,
   a movable platform equipped with at least one magnet, and
   suspension elements providing an elastic connection between said movable platform and said supporting base,
   wherein said magnet and said electrical coils are arranged in such a way that translational and/or rotational relative movements of said movable platform and supporting base are generated when a current is passed through said electrical coils, said electrical coils are positioned flat on or in said supporting base, thereby forming an essentially flat arrangement with said supporting base, and said magnet is positioned flat on or in said movable platform, thereby forming an essentially flat arrangement with said movable platform.

19. The system according to claim 1, having at least three degrees of freedom, wherein said system comprises at least three controllers and is usable to align two essentially planar devices and/or to bring two essentially planar devices into contact in such a way that the surfaces of said devices are kept essentially parallel.

20. A storage system comprising a storage medium, a writing and/or sensing device and a magnetic scanning or positioning system for approaching and scanning said storage medium and said writing and/or sensing device relative to each other, said magnetic scanning or positioning system with at least two degrees of freedom further comprising
   a supporting base equipped with at least one magnet,
   a movable platform equipped with at least two electrical coils, and
   suspension elements providing an elastic connection between said movable platform and said support base,
   wherein said magnet and said electrical coils are arranged in such a way that translational and/or rotational relative movements of said movable platform and supporting base are generated when a current is passed through said electrical coils, and said electrical coils are positioned flat on or in said movable platform, thereby forming an essentially flat arrangement with said movable platform.

21. A method for fabricating a movable platform with integrated electrical coils comprising the steps of:
   producing deep trenches in a flat substrate, which have the shape of said electrical coils to be formed,
   opening the deep trenches from the backside,
   filling said deep trenches with an electrically conductive material,
   providing a second level metallization.

22. The method according to claim 21, wherein an insulation layer is grown or deposited on the sidewalls of said deep trenches, if said substrate is conductive.

23. The method according to claim 21, wherein said deep trenches are opened from the backside by backside etching.

24. The method according to claim 21, wherein in an additional step the substrate areas around the movable platform are removed to release the movable platform from the substrate.

25. The method according to claim 21, wherein the process steps and said flat substrate are also used to fabricate a supporting frame and/or suspension elements.

26. The method according to claim 21, wherein said deep trenches are filled with a conductive material using galvanic plating.

27. The method according to claim 21, wherein narrow bridges in a sacrificial layer are used to keep said movable platform together during backside etching and filling of said deep trenches.

28. The method according to claim 27, wherein a conductive seed layer is used for filling the deep trenches by galvanic plating.

29. The method according to claim 21, wherein said substrate is a silicon wafer.

* * * * *